United States Patent [19]

Bauer

[11] Patent Number: 5,433,035
[45] Date of Patent: Jul. 18, 1995

[54] TALKING ENTERTAINMENT CARD

[76] Inventor: Timothy R. Bauer, 1604 Goventry La., Glen Mills, Pa. 19342

[21] Appl. No.: 945,820

[22] Filed: Sep. 15, 1992

[51] Int. Cl.⁶ .......................... G09F 1/00; G09F 27/00
[52] U.S. Cl. .............................. 40/124.1; 40/455; 40/463; 429/100
[58] Field of Search .................. 40/124.1, 455, 457, 40/463, 464, 1.5, 902, 906; 429/163, 164, 97, 99, 100, 96; 368/88, 82, 84, 63; 224/902

[56] References Cited

U.S. PATENT DOCUMENTS

| | | | |
|---|---|---|---|
| 2,975,226 | 3/1961 | Lehr | 429/97 |
| 3,798,806 | 3/1974 | Sanford | 40/455 |
| 4,102,067 | 7/1978 | Tarrane | 40/455 |
| 4,269,908 | 5/1981 | Stemme | 429/100 X |
| 4,531,310 | 7/1985 | Acson et al. | 40/455 X |
| 4,656,469 | 4/1987 | Oliver et al. | 340/802 |
| 4,748,756 | 6/1988 | Ross | 40/455 X |
| 4,778,428 | 10/1988 | Wield | 446/47 |
| 4,791,741 | 12/1988 | Kondo | 40/124.1 |
| 4,866,865 | 9/1989 | Yang | 40/455 |
| 4,934,079 | 6/1990 | Hoshi | 40/463 X |
| 4,951,203 | 8/1990 | Halanka | 364/419 |
| 4,973,941 | 11/1990 | Davis et al. | 446/297 x |

Primary Examiner—Peter Nerbun
Attorney, Agent, or Firm—Stinson, Mag & Fizzell

[57] ABSTRACT

The present invention relates to a novel and unique entertainment card device such as a baseball trading card or a music rock star trading card comprising a flat, rectangular card including a touch sensitive element for sound activation. Replaceable electrical power batteries are mounted within the card. The touch sensitive element is activated by simply touching a surface area of the front side of the flat rectangular card. The entertainment card device further includes entertainment pictures such as of sports figures or music rock star images.

4 Claims, 2 Drawing Sheets

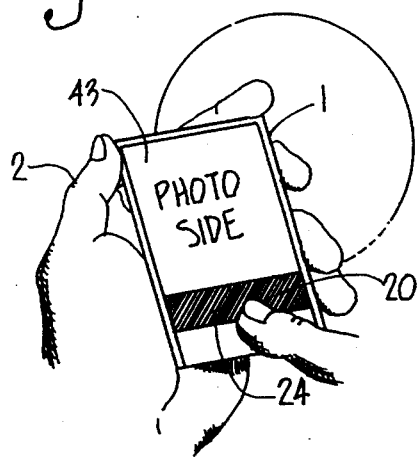
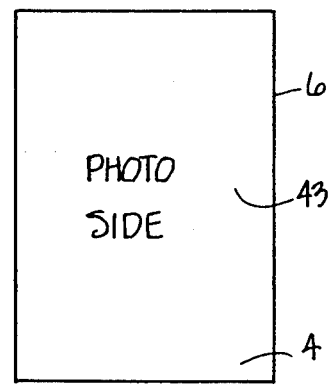
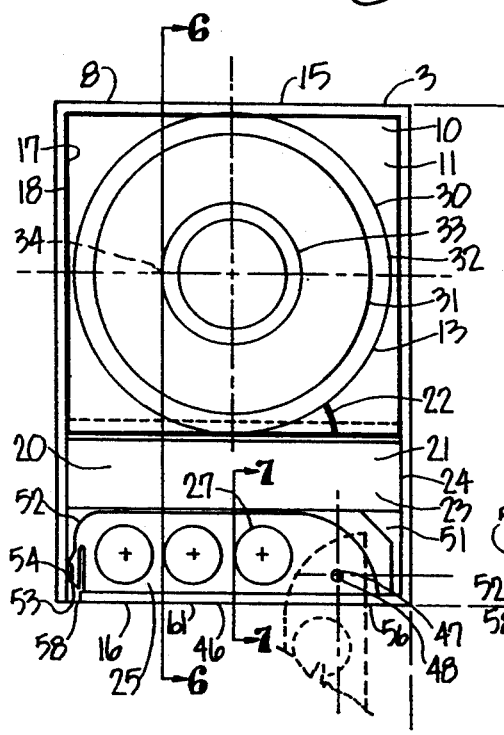

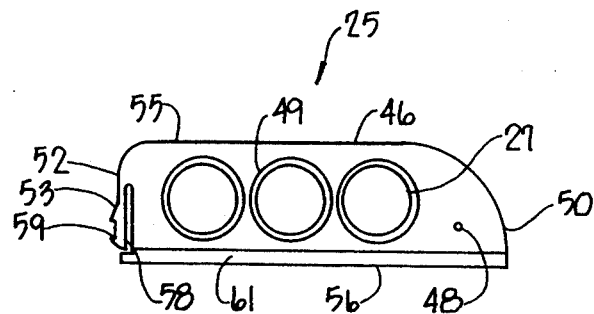
Fig. 5
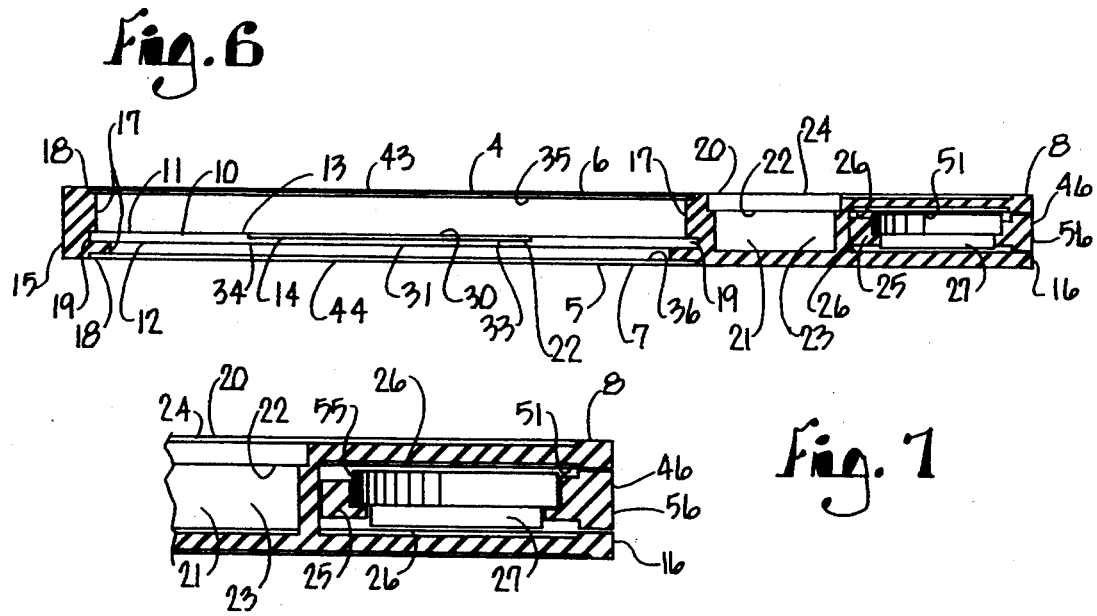
Fig. 6
Fig. 7
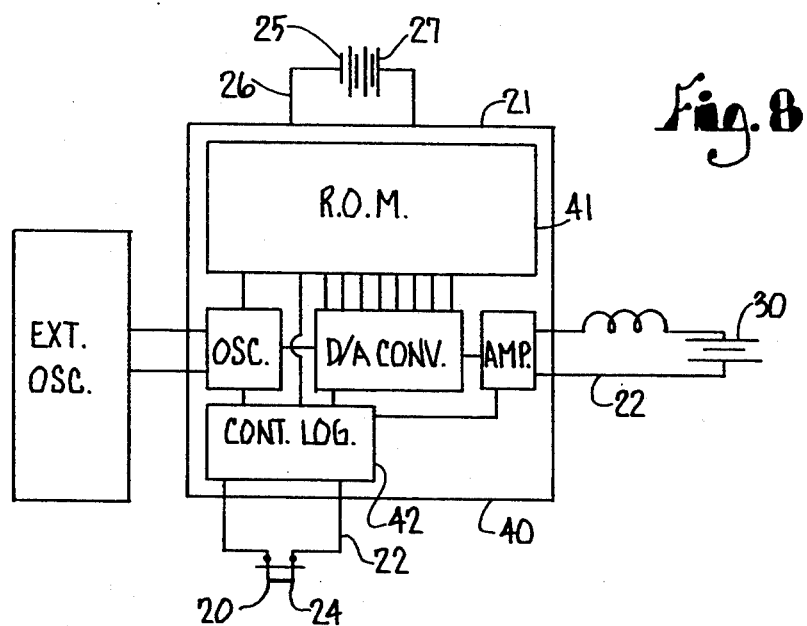
Fig. 8

TALKING ENTERTAINMENT CARD

FIELD OF THE INVENTION

This invention relates to entertainment cards having a touch sensitive activated surface, and specifically to an entertainment trading card having a picture of a sports or entertainment person and a touch activated surface area for producing sound.

BACKGROUND OF THE INVENTION

There exist in the art touch activated picture frames, such as disclosed in the Ross U.S. Pat. No. 4,748,756, that includes a picture frame enhanced with a light or sound generating device which is activated by a touch sensitive contact area. There are also musical greeting cards, a combined greeting card with musical box structures that include a greeting card and a musical sound being produced upon activation of a spring loaded actuator pin, such as in the Sanford U.S. Pat. No. 3,798,806 and the Tarrant U.S. Pat. No. 4,102,067. The Sanford '806 and the Tarrant '067 patents disclose devices that require the activation of the actuator pin before sound is produced. The Ross '756 patent includes a touch sensitive contact area which activates and controls the light or sound enhancement in the picture frame. There is, however, a need for an entertainment trading card that would include a sound generating device that is activated by simply touching a touch sensitive control surface. Further, to insure the longevity and the enjoyment of the entertainment trading card, a removable and replaceable electrical power source would be required to provide long use of the entertainment trading card.

There is a need for a durable, inexpensive, simply operated, and effective entertainment trading card that can produce sound and display entertainment pictures, while also having the ability to have a replaceable power source.

SUMMARY OF THE INVENTION

This invention contemplates an entertainment trading card including a flat, rectangular card having a battery holder. The entertainment card has a front and rear side that display entertainment pictures. The front side includes a touch sensitive activation control surface for activating a sound generating device.

The objects of the present invention are: to provide a flat rectangular card having a front side, a rear side, a top end, and a bottom end having a battery holder; provide such an entertainment card device with means for holding and displaying entertainment pictures; to provide an entertainment trading card with means for sound activation being placed in the front side of the flat rectangular card; to provide an entertainment card device with an electronic power means for activating the sound activation means; to provide an entertainment trading card with a bottom end having a rectangular shaped indentation forming a channel that is adapted to receive a battery holder; to provide an entertainment card that has a battery holder which is pivotally connected to the bottom end of a flat, rectangular card; to provide an entertainment card that includes a touch sensitive activation means and a control circuit means for controlling the touch sensitive activation means; to provide an entertainment card that includes an electrical power means having a plurality of batteries that are removable and replaceable; and to provide such an entertainment card that is inexpensive and durable.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a perspective view of the entertainment card device and showing a user pressing a touch sensitive activation switch.

FIG. 2 is a top plan view of the printed top cover of the entertainment card device.

FIG. 3 is a top plan view of the plastic module of the entertainment card device and discloses a speaker, the touch sensitive activation switch and a pivotal battery holder.

FIG. 4 is a disassembled, perspective view of the entertainment card device and discloses a plastic module with a printed cover and a printed bottom cover with panels between the covers and the plastic module.

FIG. 5 is an enlarged top plan view of the pivotal battery holder of the entertainment card device and discloses the batteries.

FIG. 6 is an enlarged cross-sectional view of the entertainment card device taken along lines 6—6, FIG. 3, disclosing the pivotal battery holder, the touch sensitive activation switch, the speaker and the printed top and bottom covers.

FIG. 7 is an enlarged cross-sectional view of the entertainment card device taken along lines 7—7, FIG. 3, disclosing the pivotal battery holder and the touch sensitive contact area. FIG. 7 is an expanded view to assist in differentiating between the touch sensitive electrical plates 26 and the batteries. FIGS. 6 and 8 accurately illustrate the touch sensitive electrical plates 26 contact batteries 27.

FIG. 8 is an enlarged schematic drawing of the circuit control board for the entertainment card device.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Referring to the drawings in more detail;

FIG. 1 generally shows a perspective view of an entertainment card device 1, which is preferably 3.5 inches in length and 2.5 inches in width, and discloses a user 2 pressing a touch sensitive activation switch (hereinafter described) of the card device 1.

Referring to FIGS. 1, 2, 3 and 4, the card device 1 includes a flat, rectangular card 3 that has a front facing side 4 and a rear facing side 5. The front and rear facing sides 4 and 5 of the card device 1, respectively, include front and rear printed covers 6 and 7. The covers 6 and 7 are identical in size with an approximate thickness of 0.008 inches in order to have the dimensions of a standard size trading card, commonly termed a "baseball" card, and preferably have an approximate length of 2.37 inches and an approximate width of 3.37 inches. The term "trading" card is used generically herein and refers to sports trading cards, such as used for baseball, football and basketball, and also refers to those trading cards which depict rock music or other such popular entertainment figures. Additionally, there have been cards bearing likenesses of imaginary figures engaged in antisocial activities and sold under the trademarks "GARBAGE PAIL KIDS" (TOPPS TRADING CARDS). These are all "trading cards" for which the present invention is directed. These cards also typically have printed information about the depicted person, and for sports figures, various performance statistics.

As best seen in FIGS. 3, 4 and 6, the flat, rectangular card 3 of the card device 1 comprises a plastic module 8 that is preferably molded. The dimensions of the plastic module 8 are approximately 3.5 inches in length, a width of 2.5 inches with a thickness of 0.265 inches. The plastic module 8 includes an inner flat surface 10 having a front side 11 and a rear side 12, a top end 15 and a bottom end 16.

The flat, rectangular card 3 also has inner sides 17 located on the front and rear sides 4 and 5. The inner sides 17 include a shelf 18 that supports the front and rear printed covers 6 and 7. The front and rear printed covers 6 and 7 are securely fastened to the shelf 18 of the inner sides 17 by adhesive. The front side 4 of the card device 1 includes a touch sensitive contact area 20 and a control circuit board 21.

As best seen in FIG. 6, the inner flat surface 10 has a recess area 13 having a recess aperture 14. The front side 11 of the inner flat surface 10 is approximately 0.146 inches below the front printed cover 6, and includes a speaker system 30. The rear side 12 of the inner flat surface 10 is approximately 0.061 inches above the rear printed cover 7. The inner flat surface 10 is held securely in place within the plastic module 8 by indentations 19 along the inner sides 17. The indentations 19 form channels along the inner sides 17 with the outer edges of the inner flat surface 10 being located within the channels.

Referring to FIGS. 3 and 4, the speaker system 30 is located in the recess area 13 and comprises a thin speaker 31 which, in the illustrated example, is made of compressed foam with an approximate thickness of 0.042 inches. A exemplary suitable speaker is manufactured by Varsity Electronics Co., Ltd. in Hong Kong. The foam acts as a diaphragm/resonator and is secured in place by a retainer 32 formed of a plastic snap ring. In the center of the speaker 31 is a round wafer 33 of brass that has an approximate outside diameter of 1.125 inches. In the center of the round brass wafer 33 on the front and back of the wafer 33 is a second wafer forming a ceramic resonator with an approximate outside diameter of 0.75 inches.

The speaker system 30 is preferably electrically connected to the control circuit board 21 by three electrical transmission wires 22. Two of the electrical transmission wires 22 are soldered to the front side of the center of the round brass wafer 33.

As seen in FIGS. 3, 4, and 6, the third electrical transmission wire 22 is soldered to the back side of the round brass wafer 33. The speaker system 30 is held in place in the recess area 13 by a foil disk 34, which is larger than the round brass wafer 33, that has an approximate diameter of 1.56 inches and has an adhesive backing. The adhesive backing of the foil disk 34 makes contact only with the rear side 12 of the recess area 13 of the plastic module 8. The rear side of the round brass wafer 33 extends through the aperture 14 of the recess area 13 of the inner flat surface 10 of the plastic module 8 and makes contact with the adhesive backing of the foil disk 34, which assists in securing the speaker assembly 30 in place to the inner flat surface 10.

Referring to FIGS. 4 and 6, the entertainment card device 1 includes top and rear panels 35 and 36 that are located immediately beneath the front and rear printed covers 10 and 11, respectively. The panels 35 and 36 are preferably made of aluminum and have an approximate length of 2.187 inches, width of 2.374 inches and a thickness of 0.30 inches. The panels 35 and 36 have many through holes 37, such as die-cut holes, that allow the sound from the speaker 31 to escape, while also acting as a shield to protect the fragile speaker system 30. The panels 35 and 36 are positioned adjacent to and immediately upon the shelves 18 of the inner sides 17 of the plastic module 8.

As best seen in FIGS. 6 and 7, the plastic module 8 of the entertainment card device 1 has a control circuit indentation 23, which forms a cavity for the control circuit board 21, and has a pivotal battery holder 25 at the bottom end 16. The control circuit indentation 23 has an approximate depth of 0.204 inches and width of 0.442 inches. The touch sensitive control area 20 is located above and adjacent to the control circuit indentation 23, and is directly under the front printed cover 6. The touch sensitive control area 20 has an approximate thickness of 0.047 inches and width of 0.5 inches. As seen in FIGS. 6, 7 and 8, the touch sensitive control area 20 includes a touch sensitive activation switch 24 that is electrically connected to the circuit board 21 by electrical transmission wires 22. The touch sensitive activation switch 24 is also electrically connected to the pivotal battery holder 25 by touch sensitive electrical plates 26 and electrical transmission wires 22. The touch sensitive electrical plates 26 have an approximate thickness of 0.005 inches. When the user 2 touches the touch sensitive control area 20, the touch by user 2 supplies an electrical pulse which completes the circuit illustrated in FIG. 8. Thus elctrical contact is made between touch sensitive activation switch 24 and the touch sensitive electrical plates 26, through the electrical transmission wires 22, and allows the battery holder 25, that has preferably three batteries 27, to electrically power the circuit board 21.

Referring to FIG. 8, an enlarged schematic drawing of the control circuit board 21 is disclosed. The control circuit board 21 is a speech chip 40, such as an ADPCM module DHL #5480383, that includes a read only memory (ROM) 41 and a control logic unit 42. The control circuit board 21 has electrical transmission wires 22 that are connected to the speaker system 30. The ROM 41 preferably includes information about the sports or music entity whose picture 43 and information 44 are printed on the front and rear printed covers 6 and 7. When the user 2 activates the control circuit board 21 by pressing the touch sensitive contact area 20, the touch sensitive activation switch 24 is energized thereby allowing the control logic unit 42 to activate the speech chip 40. By activating the speech chip 40 the speech or music information encoded in the ROM 41 is transmitted to the speaker system 30.

Referring to FIGS. 3, 4, 5, 6 and 7, the bottom end 16 having the pivotal battery holder 25 of the plastic module 8 is disclosed. The pivotal battery holder 25 comprises preferably three batteries 27, each battery 27 preferably being a small watch size battery having an approximate diameter of 0.454 inches, with a voltage of 1.5 to 2 volts DC, thus providing a total of 4.5 to 6.0 DC volts. The pivotal battery holder 25 includes a rectangular shaped attachment 46 that has a pin 47, two pin apertures 48, three battery indentations 49, a pivoting end 50, a channel 51 and a working end 52. The batteries 27 are inserted into the battery indentations 49 with the top and bottom of the batteries 27 exposed approximately 0.014 inches. The top and bottom of the batteries 27 are below and above, respectively, the touch sensitive electrical plates 26. See FIG. 6.

The rectangular shaped attachment 46 is connected to the bottom end 16 of the plastic module 8 by the pin 47 that is inserted through the pin apertures 48, which are located in the right side of the bottom end 16. The pin 47 is held in place by adhesive placed at the top and bottom ends of the pin apertures 48 of the plastic module 8. Alternatively, the pin 47 also can be held in place by having the top and bottom ends of the pin apertures 48 of the plastic module 8 be slightly smaller in diameter when compared to the outer diameter of the pin 47. The pin 47 is therefore wedged in place by the smaller sized top and bottom ends of the pin apertures 48.

The rectangular shaped attachment 46 has a thickness of approximately 0.093 inches and a length of 2.188 inches. The rectangular shaped attachment 46 has a top end 55 and a bottom end 56. The top end 55 of the rectangular shaped attachment 46 is inserted into the channel 51 that is located at the bottom end 16 of the plastic module 8. The channel 51 is sized to allow the rectangular shaped attachment 46 to be completely pivoted into the channel 51, leaving the bottom end 56 flush with the sides of the bottom end 16 of the plastic module 8.

The working end 52 of the rectangular shaped attachment 46 of the pivotal battery holder 25, when the pivotal battery holder 25 is positioned within the channel 51, has a resilient finger 53 making contact with a lug 54. The lug 54 is adjacent to and integral with the left inner wall of the channel 51. The resilient finger 53 includes a backing slot 58 into which the finger 53 flexes, a notched end 59 that selectively engages the lug 54 extending from the inner wall of the channel 51 and acting to lock the pivotal battery holder 25 into a closed position, FIG. 3. When the lug 54 makes contact with the resilient finger 53, the pivotal battery holder 25 is held in a closed position.

The pivoting end 50 of the rectangular shaped attachment 46 of the pivotal battery holder 25 has a rounded corner to allow the pivoting end 50 to swing 90 degrees about the rotating pin 47 without interference. The bottom end 56, FIG. 5, of the rectangular shaped attachment 46 has a lip 61 that is attached to and integral with the bottom end 56 and extends along the full length of the bottom end 56. The lip 61 has a length of approximately 2.188 inches, a thickness of 0.125 inches and a width of 0.075 inches. The lip 61, when the pivotal battery holder 25 is pivoted into the channel 51, allows the bottom end 56 of the rectangular shaped attachment 46 of the pivotal battery holder 25 to fit snugly against the bottom end 16 of the plastic module 8.

The pivotal battery holder 25 allows the user 2 to easily replace the batteries when needed, and to use the entertainment card device 1 for a long period of time.

The entertainment card device 1 relates to a novel and unique entertainment card device such as a baseball card or a music rock star trading card. The entertainment card device 1 comprises a flat, rectangular card 3 that includes a touch sensitive contact area 20 for sound activation of the speaker system 30 and a pivotal battery holder 25 which holds replaceable, small watch size batteries 27. To activate the speaker system 30, a user 2 simply applies pressure to the touch sensitive contact area 20. The pressure causes the touch sensitive electrical plates 26 to make contact with the batteries 27, which energizes and powers the speech chip 40 that sends the speech or music information to the speaker system 30. The speech chip 40 includes a ROM 41 that has information about the sports or music entity whose picture 42 and information 43 are printed on the front and rear printed covers 6 and 7 of the entertainment card device 1. The batteries 27 are easily replaced when needed, thereby allowing for continued enjoyment and use of the entertainment card device 1.

It is to be understood that while certain forms of this invention have been illustrated and described, the invention is not limited thereto, except insofar as such limitations are included in the following claims.

What is claimed and desired to be secured by Letters Patent is as follows:

1. An entertainment device comprising:
 a) a thin module having a rectangular perimeter, said module having a front side, a rear side, a top end, and a bottom end having a battery holder, said front side having a recess area, said bottom end having a rectangular shaped indentation forming a channel and an extending member, said channel adapted to receive said battery holder, said battery holder having a working end and a pivoting end, said pivoting end having connection means with said bottom end of said module, said working end having a resilient finger, and said extending member engaging said resilient finger to hold said battery holder inside said channel;
 b) means for holding and displaying entertainment pictures and information, said holding and displaying means having panels and shelf extensions, said panels being located in between respective ones of said shelf extensions and said pictures and information, and said shelf extensions being adapted to receive said pictures and information;
 c) a speaker and means for sound activation including a touch sensitive activation means and a control circuit means for controlling said touch sensitive activation means, said touch sensitive activation means having a touch sensitive area for sensing a module holder's touch, said control circuit means being located in a cutout volume of the module beneath said touch sensitive contact area such that said control circuit means is located beneath said touch sensitive activation means, said control circuit means having electrical connections with said speaker, said speaker being placed in between said panels, and said panels providing contact protection to said speaker; and
 d) electrical power means for activating said means for sound activation, said electrical power means having a plurality of batteries, said batteries being removable and replaceable and placed in said battery holder, and said electrical power means being electrically connected to said speaker through said electrical connections.

2. The entertainment device set forth in claim 1 wherein said battery holder includes:

a) a recess and a fastening means for securing said plurality of batteries within said module;
b) said recess including a plurality of circular indentations for holding said plurality of batteries; and
c) said fastening means including a lug and a resilient finger, said lug indentation being incorporated into said bottom end of said module and said resilient finger being incorporated into said working end of said battery holder, said lug engaging said resilient finger to hold said battery holder inside said channel.

3. The entertainment device set forth in claim 1 wherein said connection means of said pivoting end of said battery holder includes:
a) a rotating pin and an aperture;
b) said rotating pin being incorporated into said bottom end of said module; and
c) said aperture of said battery holder being adapted to receive said rotating pin to connect said battery holder to said bottom end of said module.

4. An entertainment device comprising:
a) a thin module having a rectangular perimeter, said module having a front side, a rear side, a top end, and a bottom end having a battery holder, with:
 i) said front and rear sides having inner sides;
 ii) said bottom end having a rectangular shaped indentation forming a channel, said channel receiving said battery holder;
 iii) said battery holder having a working end, a pivoting end, a recess, and a fastening means for holding said battery holder inside said channel;
 iv) said pivoting end having connection means with said bottom end of said module;
 v) said recess including a plurality of circular indentations;
 vi) said fastening means including a lug and a resilient finger, said lug being incorporated into said bottom end of said module and said resilient finger being incorporated into said working end of said battery holder, said lug engaging said resilient finger to hold said battery holder inside said channel; and
 vii) said connection means of said pivoting end of said battery holder having a pin and an aperture, said pin being incorporated into said bottom end of said module, said aperture of said battery holder being adapted to receive said pin to connect said battery holder to said bottom end;
b) means for holding and displaying entertainment pictures and information, said holding and displaying means comprising:
 i) a shelf extension located on said inner sides of said front and rear sides;
 ii) said shelf extensions being adapted to receive said pictures and information; and
 iii) panels being located in between respective ones of said shelf extensions and said pictures and information;
c) a speaker and means for sound activation including a touch sensitive activation means and a control circuit means for controlling said touch sensitive activation means, said touch sensitive activation means comprising:
 i) a touch sensitive contact area for sensing a module holder's touch;
 ii) said control circuit means and said touch sensitive activation means being located in a cutout volume of said module beneath said touch sensitive contact area such that said control circuit means is beneath said touch sensitive activation means; and
 iii) said control circuit means having electrical connections with said speaker;
d) said speaker being placed in between said panels, said panels providing contact protection to said speaker; and
e) an electrical power means for activating said means for sound activation, said electrical power means having:
 i) a plurality of batteries, said batteries being removable and replaceable, and being placed in said circular indentations in said battery holder; and
 ii) said electrical power means being electrically connected to said speaker through said electrical connections.

* * * * *